July 9, 1946.  J. D. WALKER  2,403,695
APPARATUS FOR TREATING SEWAGE
Filed Dec. 4, 1941  3 Sheets-Sheet 1
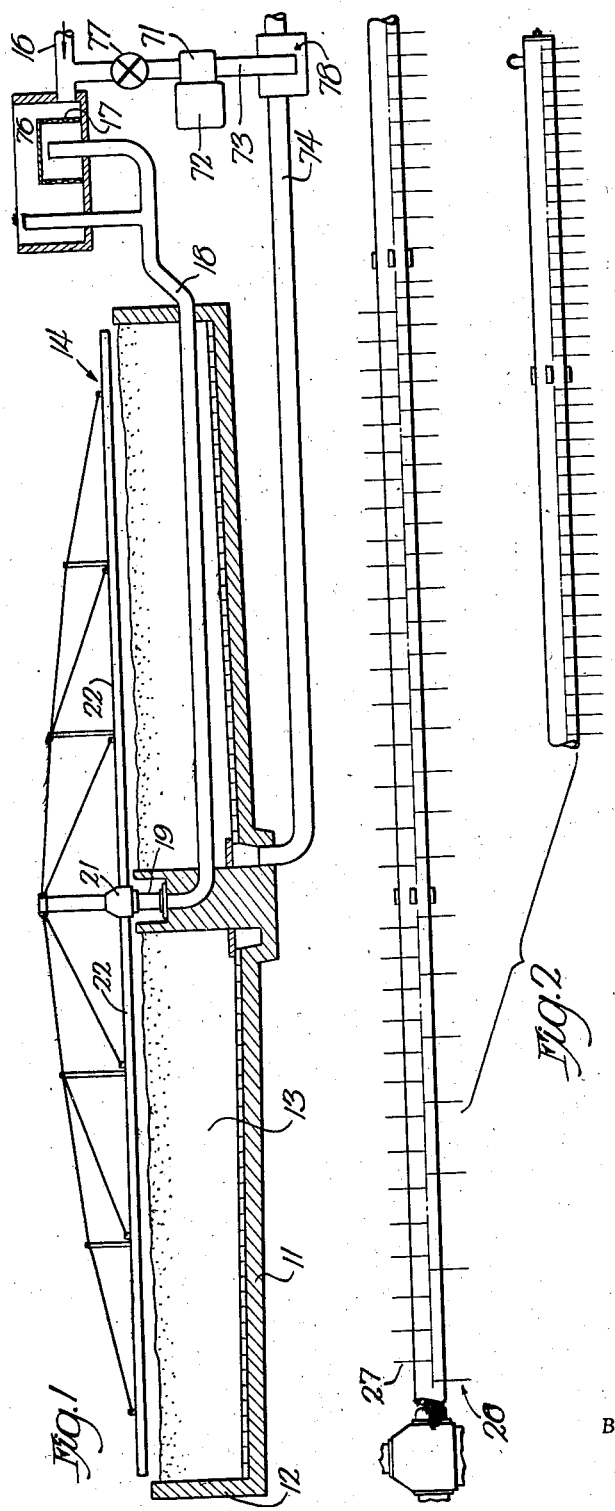
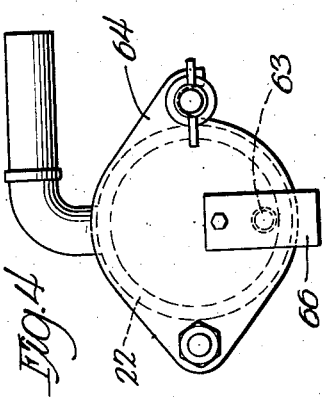
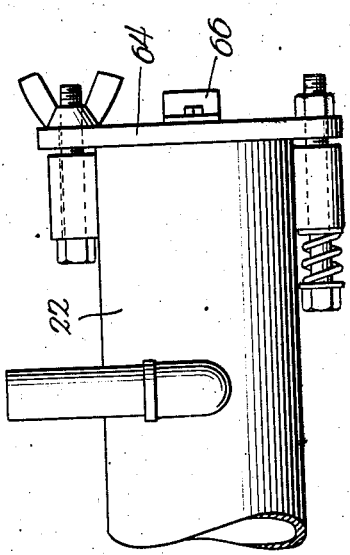
INVENTOR.
James D. Walker
BY Marm, Brown & Cox
ATTYS.

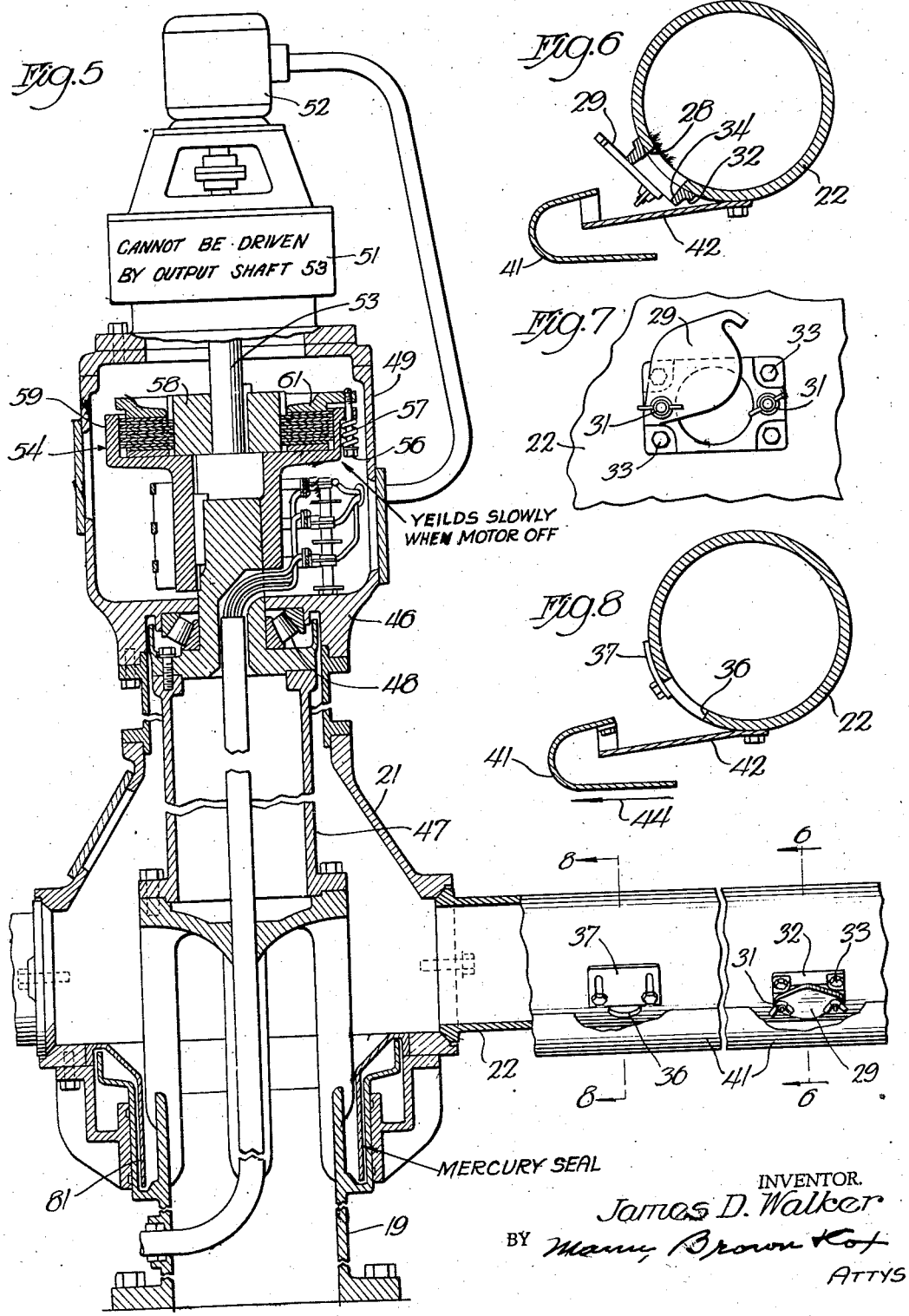

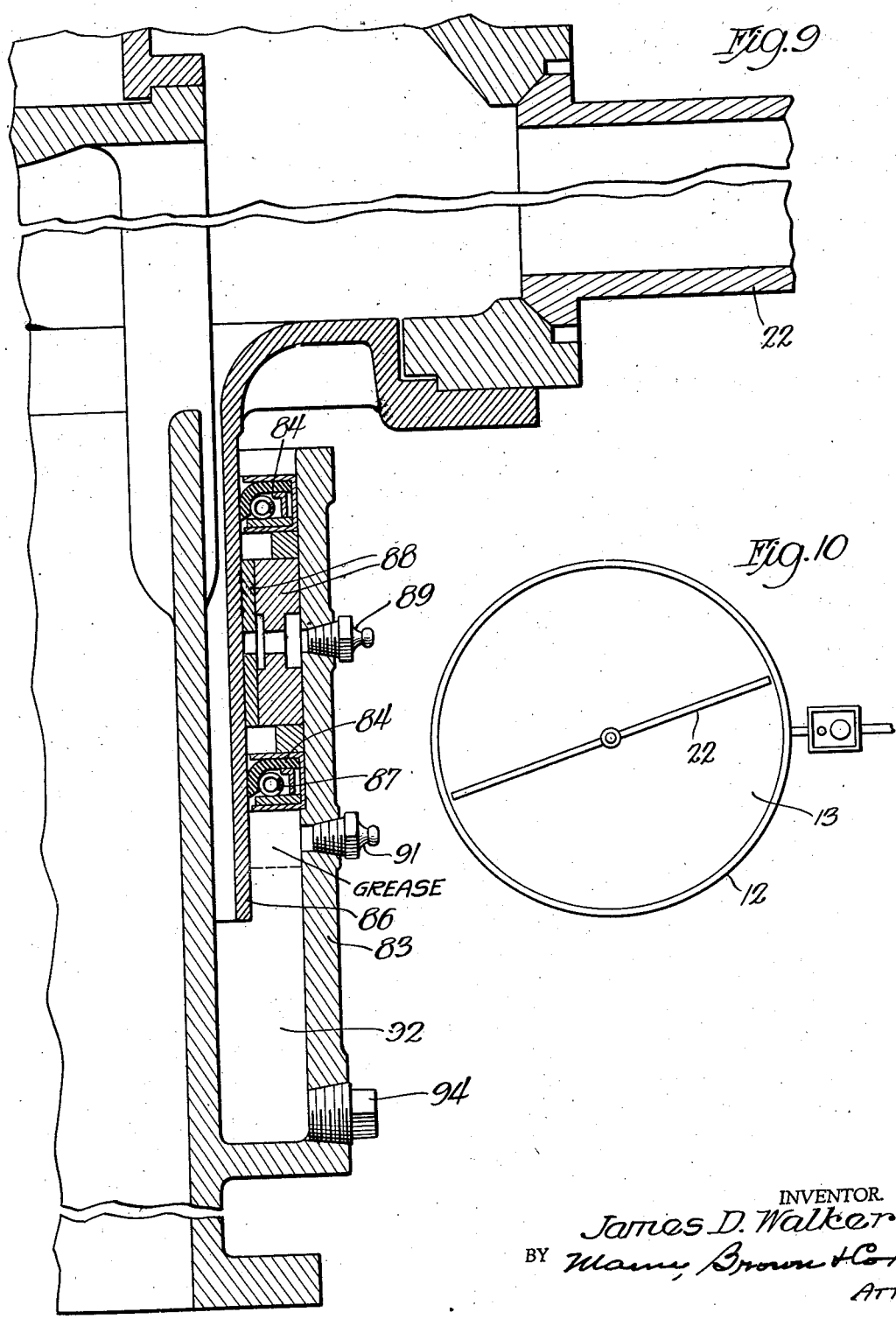

Patented July 9, 1946

2,403,695

UNITED STATES PATENT OFFICE 2,403,695

APPARATUS FOR TREATING SEWAGE

James D. Walker, Aurora, Ill., assignor to The American Well Works, Aurora, Ill., a corporation of Illinois Application December 4, 1941, Serial No. 421,531

9 Claims. (Cl. 210—7)

Trickling filters for sewage have long been recognized as having some advantages over the activated sludge treatment and have recently been recognized as extremely desirable for use in advance of activated sludge treatment. However, there has been one very great objection to trickling filters, namely that they formed a breeding place for the very obnoxious filter fly. These filter flies are believed to be more properly identified as *Psychoda alternata*, but regardless of their identity they have been prolific enough to constitute a severe nuisance not only to the operators but to the whole neighborhood, and perhaps a health menace as well.

Various attempts have been made to combat the filter flies, one of the most common being to shut off the filter drain so as to flood the filter. Aside from the fact that it didn't do the job anyway, this was very objectionable because it completely prevented the proper action of the filter inasmuch as the useful bacteria in the filter require the presence of air. Furthermore, after flooding the filter it could only be restored to usefulness by releasing its entire contents of untreated and possibly septic sewage. This would be likely to overload any subsequent treating apparatus, or if it were deposited directly into a stream would seriously pollute the stream.

Although the flooding may have alleviated the difficulty by temporarily closing off the breeding ground, it never did a thorough job of ending the filter fly evil. Applicant has determined that this is because the filter fly larva will not drown and many of them remain in the filter after flooding and draining so that more filter flies begin to appear as soon as the filter is restored to operation.

According to the present invention, the filter fly evil is substantially eliminated by flushing all of the larvae out through the filter bed. Instead of attempting in vain to drown the flies and larvae they are washed out, being disposed of with the rest of the sewage. Applicant, furthermore, has developed a highly practical apparatus for flushing out the larvae. By flushing out the larvae at intervals shorter than the non-flying period of the life of the filter fly, it will be apparent that substantially the only filter flies present will be those which are drawn to the filter from elsewhere.

The entire flushing procedure may take less than an hour, and hence there is substantially no objectionable interruption of the sewage treatment. There is no accumulation of untreated sewage to be released all at once at the end of a flooding period, and hence there is no overloading of subsequent apparatus nor appreciable polluting of a stream. As a matter of fact, even during the treatment period the sewage probably receives some partial treatment as it is flushed through the filter bed, although this may not be at all necessary in view of the short period of flushing.

Additional objects and advantages of the invention will be apparent from the following description and from the drawings, in which:

Fig. 1 is a vertical sectional view of a trickling filter unit, showing diagrammatically the fluid supply and recirculating means provided in accordance with this invention.

Fig. 2 is a view on a larger scale of one arm of the rotary distributor, showing the spacing of the normal distributing orifices and of the auxiliary flushing orifices.

Fig. 3 is an enlarged detail view of the outer end of the rotating distributor arm.

Fig. 4 is an end view of the structure shown in Fig. 3.

Fig. 5 is a vertical sectional view showing particularly the means for controlling the rotation of the rotary distributor.

Fig. 6 is a transverse vertical sectional view through one arm of the rotary distributor, taken approximately on the line 6—6 of Fig. 5, at the position of an auxiliary orifice.

Fig. 7 is a face view of the gate valve shown in Fig. 6.

Fig. 8 is a view corresponding to Fig. 6 but taken approximately on the line 8—8 of Fig. 5 at the position of a normally open orifice.

Fig. 9 is a fragmentary vertical sectional view showing a modified form of rotary seal which may be used with this invention.

Fig. 10 is a plan view of the filter unit in which this invention may be incorporated.

A preferred form of the invention (with an alternative seal) has been chosen for illustration and description, in compliance with Section 4888 of the Revised Statutes, but persons skilled in the art will readily perceive other means embodying one or more inventive concepts herein disclosed for accomplishing the same results, and it is applicant's desire that these as well as the form chosen for illustration be covered by the patent.

Fig. 1 illustrates the general combination comprising this invention, the trickling filter including a floor 11, side walls 12, a filter bed 13 of any suitable filter medium such as stones, and a rotary distributor 14. Sewage to be treated enters the system at 16 and normally flows through a screen 17 to pipe 18 and through support means or pedestal 19 to rotary manifold 21, from which it flows into distributor arms 22 which constantly rotate at a fair speed so that the sewage liquor is sprinkled fairly lightly all over the surface of the filter bed 13. The discharge orifices in the arms 22 are spaced much more closely together at the outer end of the arm than at the inner end because of the fact that a much larger area of the filter bed is sprinkled by each linear foot of the arm at the outer end than at the inner end. In other words, the spacing of the orifices should ideally be such as to sprinkle the entire bed uniformly.

With the light sprinkling resulting from the normally rotating distributor 14 the amount of water deposited at any one point on each revolution is so small that it trickles gently through the filter. With this method of operation the biological flocs which accumulate on the rock and which are necessary to the purification of the sewage are not flushed away except that, as they become larger and larger, they will eventually be broken off or broken apart, often by the weight of the floc itself rather than by the flow of water.

This gentle trickling action also leaves undisturbed tremendous numbers of larvae of the filter fly, which in due time develop into filter flies which in turn will deposit millions of eggs within the filter bed. It has long been recognized that the filter flies in the vicinity of a trickling filter are very annoying, possibly a health menace, and in any event give rise to perhaps the strongest objection to the use of trickling filters.

Efforts to rid the trickling filters of the filter fly have consisted mainly in flooding the filter with the idea of drowning the flies and perhaps with the additional expectation of drowning the larvae. This flooding of the filter has been very objectionable, however, because when the flooding period is over and the pent-up sewage is released there is great danger of overloading the following sewage treating equipment or in polluting a stream if there is no adequate treatment subsequent to the release of the sewage from the flooded filter.

Furthermore, I have determined that the flooding of the filter in this manner does not kill the larvae and I have developed a method and apparatus which are effective for getting rid of the larvae.

If a large volume of liquor is run onto the filter bed at one point therein, the liquor will not trickle gently through the filter as in the normal operation of the filter but will run rapidly downwardly through the rock, tearing off from the rock anything that is readily separable therefrom. Great quantities of flocs will be torn loose and washed down through the filter and out through the filter drain, and the filter fly larvae will be carried with these flocs. The larvae may then be disposed of or killed in any suitable way, usually by being settled out and carried to the digester where the natural action of the digester kills the larvae.

My method of ridding the filter of the filter fly nuisance therefore consists in supplying a sufficient volume of liquor to a given portion of the filter bed, and eventually to all portions, to wash from the filter substantially all of the filter fly larvae or at least a sufficient proportion thereof to keep the fly population so reduced that it will not constitute a nuisance. In short, the larvae are flushed out of the filter bed by abnormal volumes of liquor flowing therethrough.

According to the present invention, this flushing of the filter bed is preferably accomplished with very little labor and with very little additional expense. The rotary distributor may be used for this purpose, although it is preferably modified by the provision of auxiliary orifices so that the discharge from the distributor arm will be uniform along its length instead of differential along its length to compensate for the greater filter area at the outer end. The reason for these auxiliary orifices is that the rotation of the distributor arm is greatly retarded during flushing and in fact the arm moves so slowly that at any given instant its motion is negligible. By this is meant that the flow of liquor through a given point of the filter bed is not greatly reduced by the movement of the distributor arm as compared to what the flow of liquor would be if the filter arm were entirely stationary.

With a substantially stationary filter arm it will be realized on reflection that the greater area of the bed near the periphery thereof has no significance. The arm is not sprinkling the whole area at one instant but only the zone along the arm, and the flow required to saturate this zone is as great near the inner end of the arm as at the outer end, the water having the same tendency in each position to spread laterally as it flows downwardly.

Fig. 2 is a diagrammatic figure showing the spacing of the orifices. The downwardly extending lines 26 represent the positions of the normally open orifices. The position of these normally open orifices may be conventional and it will be observed that the orifices are spaced much closer together at the outer end of the arm than at the inner end of the arm. The upwardly extending lines 27 indicate the positions of the auxiliary orifices which are normally closed but which may be opened during flushing. It will be observed from Fig. 2 that these auxiliary orifices are not present at the outer end of the arm, where the normally open orifices are close together, but supplement the other orifices in an increasing ratio so that at the inner end of the arm there are three supplementary orifices to one normally open orifice. Ideally, the flow of liquor discharge from the arm during flushing should be at the same rate per linear foot of arm along the entire length of the arm.

One of the auxiliary orifices 28 is shown in Figs. 6 and 7, together with a cover or valve plate 29 which is readily shiftable, being secured in closed position by wing nuts 31 and in open position by one of these wing nuts. Usually, for flushing, the cover plates will be opened all the way so as to leave the orifices entirely unobstructed. There may be occasion, however, when it will be desirable to have them partially closed in order to obtain a more uniform discharge of liquor along the length of the arm. The exact construction of the orifices and their closures is not especially important, but, according to the preferred form, an orifice plate 32 is secured to the distributor arm 22 in any suitable manner as by screws 33 shown in Fig. 5. The wing nuts 31 may screw on threaded studs carried by the orifice plate 32. The orifice plate is provided with a ring 34 having its outer face in a plane so that it may be closed by a flat plate 29.

In the case of the normally open orifices 36 there is no necessity for providing the orifice plate 32 since these orifices 36 never need to be closed. They can be regulated by an arcuately shaped plate 37, illustrated in Figs. 5 and 8.

The provision of some means for spreading the liquor discharged from the orifice 36 is conventional. It is preferred that continuous spreader plates 41 and 42 be provided along the length of the arm 22, the plate 41 being carried by the plate 42 which in turn is secured to the arm 22 as seen best in Fig. 8. Water discharged through an orifice 36 flows against the plate 42 and is directed against plate 41 which reverses the flow of the water and spreads it out into a thin sheet or coarse spray. By having the spreader plates 41 and 42 extend continuously along the length of the arm, these same plates may be used to spread the liquor discharge from the orifices 28 when the plates 29 are open.

The flow of water against and away from the plate 41 exerts a pressure on the plate 41 which will cause a rotation of the arm in the direction indicated by the arrow 44 in Fig. 8, assuming that the arm is free to rotate. According to the present invention, the arm is rotated by this reaction during flushing, means being provided for retarding the rotation so that the arm moves much more slowly than if the retarding means were not provided. The retarding means is seen in Fig. 5, but to understand it the mounting of the distributor arms should be explained.

The distributor arms 22 are connected to the rotary manifold 21 which is carried by a rotating head 46. The head 46 is rotatably supported at the top of an extension 47 of pedestal 19, roller bearings 48 preferably being provided to ensure easy rotation of the rotary distributor. The head 46 also carries a clutch housing 49 on the top of which is mounted a gear box 51 on the top of which is mounted a driving motor 52. The rotor of the motor is connected through the gears in the gear box 51 to a shaft 53 so that the motor produces a torque between the shaft 53 and the housing parts 51, 49, 46. If the shaft 53 is restrained from rotating, the motor will therefore rotate the housing members and through them the distributor arms 22. The shaft 53 is thus normally restrained from rotation by clutch unit 54. However, when the motor initially starts with the distributor arms at rest it takes an appreciable time to bring the distributor arms up to speed in view of their inertia, and during this time the clutch 54 slips to permit the shaft 53 to rotate so that the motor can start quickly in spite of this slow starting of the distributor arm.

I have determined that with the clutch construction shown and with the proper adjustment of the tensioning nuts 56 to provide the proper pressure through springs 57 on the clutch plates, this clutch may be used very satisfactorily for retarding the speed of rotation of the distributor arms 22 during flushing. In other words, for retarding the distributor arms 22 during flushing it is merely necessary to turn off the motor 52. The gears of the gear box 51 are self-locking so that there will be no rotation between the shaft 53 and the housing 49. Accordingly, the shaft 53 must rotate with the arms 22, and if the shaft 53 is restrained from rotation the arms 22 will not rotate. The clutch 54 thus becomes a friction brake, tending to restrain rotation of the arms 22. The speed may be varied by adjusting the tensioning nuts 56.

It may be surprising that any satisfactory regulation of the arms 22 at very low speed can be obtained by a friction brake with a constant adjustment. It might seem that, once a rotational force is provided sufficient to overcome the friction of the brake, the brake would continue to slide and the speed of rotation would increase. In practice, however, there is no difficulty in this regard. With a proper setting of the nuts 56 the arms 22 will creep around at a very slow speed —perhaps about ten minutes to one hour per revolution. Although the explanation of how this is accomplished is not necessary nor is it even necessary that I know how it is accomplished, I have determined by investigation that the clutch or brake 54 does not yield or slide continuously but slides in a series of separate jumps. Apparently there is enough resiliency in the system, probably in the long arms 22, so that the arms move slightly while the brake remains immobile until a sufficient tension is built up in the rotary structure to overcome the friction in the brake, whereupon the brake yields, the tension is released, and the brake again holds to prevent further yielding until the tension of the rotary parts is again built up. Although the brake yields in a series of independent steps, the outer ends of the arms seem to be rotating constantly.

Of course, there are a wide variety of clutches which could function in this manner. One which has been found to be satisfactory is of the construction clearly illustrated in Fig. 5 with "Raybestos" molded clutch plates sandwiched between plates of Diston saw steel, one set of plates being splined to the hub 58 while the other set is splined to the ring 59. Of course, all the plates are splined loosely enough so that they may shift apart and as a result the pressure on their faces will be determined by the pressure of the pressure plate 61 under influence of a plurality of springs 57 and nuts 56 around its periphery.

Of course, it is not necessary to the present invention to use a motor driven distributor arm nor to retard it by means of a frictional brake. It could be retarded by any other means, as, for example, by hand—an operator moving slowly around the periphery of the bed and restraining a reaction driven distributor arm by hand so that its movement is negligible.

In order to flush any filter fly larvae from the side walls 12 of the tank it is preferred to provide an orifice 63 at the outer end of the arm. This orifice may conveniently be drilled through an end plate 64 secured on the end of a distributor arm 22, as clearly shown in Figs. 3 and 4. A spreader plate 66 is preferably provided but it should be disposed so that a substantial amount of the water from the orifice 63 will fall against the inner face of the wall 12 and run down the wall. Since this is a vertical and relatively smooth surface, not very much water is required for keeping it free of larvae. Accordingly, the orifice 63 may be left open at all times. The plate 64 is preferably mounted in the manner illustrated so that it may readily be opened for cleaning the distributor arm 22.

For best results in the practicing of this invention, it is necessary to have a copious volume of liquor. In many instances the supply of sewage may be adequate to provide this copious flow even when the auxiliary orifices are opened. When such is not the case, however, means for recirculating the sewage is preferably provided. As shown in Fig. 1, this means may comprise a pump 71 driven by a motor 72 and connected in a conduit 73 between the drain 74 for the trickling filter and the influent conduit 16 or the chamber 16. A valve 77 is provided to prevent flow through the conduit 73 when the pump 71 is not running. The intake of the conduit 73 should of course be so arranged as to be assured of being below the surface of the liquor flowing from the drain 74 even though this drain may not be filled to capacity. One such arrangement is illustrated diagrammatically at 78. In connection with the volume of liquor required, it may be noted that the auxiliary orifices will usually be provided on only one of the arms 22 and, if desired, means could be provided for closing off the normally open orifices on the other arm so as to concentrate all of the flow in the arm which is used for flushing. Best results are obtained by supplying enough liquor so that more liquor would not materially increase the maximum downward rate of flow at a given point, but rather the area to which it spreads.

From Fig. 5 it will be recognized that the liquor must flow up through the pedestal 19 and out into the arm 22. The pedestal 19 is stationary and the arm and manifold 21 are rotating, and hence some sort of rotary seal must be provided between the pedestal 19 and the manifold 21. In Fig. 5 a mercury seal has been illustrated—a skirt 81 carried by the manifold extending down into a pool of mercury carried by the pedestal. It will be recognized, of course, that ordinarily there is not very much pressure on the liquor and hence this seal is quite practical although it does give some trouble and is fairly expensive. The pressure will of course force the mercury down on the inside of the skirt 81 until the pressure of the mercury on the outside of the skirt balances the pressure on the inside.

A modified form of rotary seal is illustrated in Fig. 9 which is believed to be both less expensive and less troublesome than the mercury seal. Instead of a mercury seal, cup seals are provided between wall 83 carried by the pedestal and skirt 86. These cup seals may comprise flexible cups 84 which may be made of leather. They may be pressed onto the skirt 86 by a coil spring 87 forming a closed loop on the outside of the cup 84. The cups 84 will of course be held in place and sealed with respect to the wall 83 in any suitable manner as illustrated. The use of this seal has an additional advantage in that it facilitates the provision of steadying bearing means 88 of suitable bearing material. The bearing may be lubricated through a nipple 89. Any grease which may tend to seep upwardly from the bearing 88 will be retained by the upper seal cup 84. An additional nipple 91 is provided for supplying a ring of grease or oil below the lower cup 84. This ring will float on the water in the annular chamber 92 so that it will at all times lubricate the seal and protect the seal and the bearing from the water. The chamber 92 forms a settling chamber for any solids which may drop therein from the sewage liquor, and a plug 94 is provided for washing out such solids.

Of course, any other sealing medium besides grease could be injected through the nipple 91 providing that it is not injurious to the cup 84 and preferably not injurious to the bearing should small amounts of it seep into the bearing. If it is lighter than water so that it floats as described, a pet cock or gauge may be provided for making sure that a sufficient supply is present. If it is heavier than water, it may fill the entire chamber 92.

From the foregoing it is seen that a highly practical solution of the filter fly problem has been devised. With very little additional equipment expense, all or nearly all of the fly larvae can be washed from the filter in the course of about ten minutes (five, if the auxiliary orifices are opened on both arms). Not only does this end the fly nuisance but it also avoids the evils formerly attendant upon flooding the filter in an effort to abate the fly nuisance. The flushing of the filter in accordance with this invention is so easy and such a slight and harmless interruption of the normal sewage treatment process that it may be performed as often as may be desired. Experience has illustrated, however, that once a week is enough, and twice a week might be said to provide a margin of safety. Apparently all that is necessary is to flush the filter out at intervals shorter than the period elapsing between deposit of the fly egg and the development of the larva into a fly. For convenience this period may be called the non-flying period.

If desired, a time switch may be provided to shut off the motor 52 automatically every week, or even every day, for the five or ten minutes necessary for flushing. Even without opening the extra orifices, a large percentage of the larvae will be flushed out when the arm is moving slowly. During this period the pump motor 72 could be automatically started or placed under control of a float in chamber 76 to assure an adequate supply of sewage. Of course, the auxiliary orifices could be automatically opened if the expense should seem justified. Otherwise, it will be best to supplement the daily automatic flushing with a more thorough weekly flushing.

It should be understood that the flushing does not wash out all of the flocs or bacterial slime but only the excess. That which remains is enough to ensure very efficient sewage purification. This has been found to be true when the filtering medium comprised blast furnace slag, but it is believed that it would be equally true of any other suitable filtering medium.

Even aside from the fly nuisance, it would be desirable to flush the bed occasionally in accordance with this invention to prevent ponding. It may be that an important aspect of fly abatement is in clearing away the excess flocs which would tend here and there to clog the interstices between the stones, so that there is no protected place for the fly larvae. It is believed, however, that the rapid flow of water is extremely important for the direct purpose of washing out the larvae. In this connection it should be noted that best results are obtained by flushing at intervals shorter than the period during which the fly remains in the larva stage, since the larva is probably flushed out more easily than the egg.

I claim:

1. A trickling filter including a filter bed, a rotary distributor therefor having support means at a central position, a distributor arm extending outwardly therefrom, rotatably mounted with respect to the support means, provided with a plurality of normally open orifices differentially spaced to provide greater volume of discharge per linear foot of the arm near the outer, faster moving end of the arm than near the inner end of the arm, and a plurality of auxiliary orifices disposed to supplement the normally open orifices to provide approximately uniform discharge throughout the length of the distributor arm, said orifices being so disposed that the discharge therethrough will tend to drive the arm, means normally rendering said auxiliary orifices inoperable but adjustable to render them operable, motor and speed-reducing gears for driving the distributor arm but which are self-locking to prevent driving the motor by the distributor arm when the motor is not energized, a friction drive device through which power is exerted by the motor and gear unit to drive the distributor arm, said friction drive device being adapted to let the motor speed up quickly while the arm is starting slowly and to let the arm move very slowly, when the motor is turned off, under the reaction of liquor pumped through the arm, and means for recirculating sewage from the outlet of the filter bed to the distributor arm to provide a large volume flow of liquor through the arm independently of the supply of raw sewage.

2. A trickling filter including a filter bed, a rotary distributor therefor having support means at a central position, a distributor arm extending outwardly therefrom, rotatably mounted with respect to the support means, provided with a plurality of normally open orifices differentially spaced to provide greater volume of discharge per linear foot of the arm near the outer, faster moving end of the arm than near the inner end of the arm, and a plurality of auxiliary orifices disposed to supplement the normally open orifices to provide approximately uniform discharge throughout the length of the distributor arm, said orifices being so disposed that the discharge therethrough will tend to drive the arm, means normally rendering said auxiliary orifices inoperable but adjustable to render them operable, motor and speed-reducing gears for driving the distributor arm but which are self-locking to prevent driving the motor by the distributor arm when the motor is not energized, and a friction drive device through which power is exerted by the motor and gear unit to drive the distributor arm, said friction drive device being adapted to let the motor speed up quickly while the arm is starting slowly and to let the arm move very slowly, when the motor is turned off, under the reaction of liquor pumped through the arm.

3. A trickling filter including a filter bed, a rotary distributor therefor having support means at a central position, a distributor arm extending outwardly therefrom, rotatably mounted with respect to the support means, having orifices normally adapted to provide greater volume of discharge per linear foot of the arm near the outer, faster moving end of the arm than near the inner end of the arm, and adaptable to provide approximately uniform discharge throughout the length of the distributor arm, said orifices being so disposed that the discharge therethrough will tend to drive the arm, motor and speed-reducing gears for driving the distributor arm but which are self-locking to prevent driving the motor by the distributor arm when the motor is not energized, and a friction drive device through which power is exerted by the motor and gear unit to drive the distributor arm, said friction drive device being adapted to let the motor speed up quickly while the arm is starting slowly and to let the arm move very slowly, when the motor is turned off, under the reaction of liquor pumped through the arm.

4. A rotary distributor for filters, comprising support means, a rotary structure rotatably supported thereby and including a distributor arm having a plurality of orifices normally adjusted to deliver more liquor per linear foot from the outer, faster moving portion of the arm than the inner portion thereof, and auxiliary orifice areas normally closed but adapted to be opened to supplement the normally open orifices to provide a substantially uniform delivery of liquor along the length of the arm.

5. A trickling filter including a tank having circularly disposed side walls, a filter bed therein, a rotary distributor therefor having support means at a central position, and a distributor arm extending outwardly therefrom, rotatably mounted with respect to the support means, normally adapted to provide greater volume of discharge per linear foot of the arm near the outer, faster moving end of the arm than near the inner end of the arm, and adaptable to provide approximately uniform discharge throughout the length of the distributor arm, and a substantial volume of discharge outwardly from the end of the arm toward and largely against the side wall.

6. A rotary distributor for filters, comprising support means, a rotary structure rotatably supported thereby and including a distributor arm having a plurality of normally open orifices adapted to deliver more liquor per linear foot from the outer, faster moving portion of the arm than the inner portion thereof, a plurality of auxiliary orifices normally closed but adapted to be opened for cooperating with the normally open orifices to provide a substantially uniform delivery of liquor along the length of the arm, and means for retarding the speed of rotation of the arm, for flushing the filter, to such extent that the degree of saturation of the portion of the filter immediately below the arm is not substantially lessened by said rotation.

7. A rotary distributor for filters, comprising support means, a rotary structure rotatably supported thereby and including a distributor arm having discharge means normally adapted to deliver more liquor per linear foot from the outer, faster moving portion of the arm than the inner portion thereof, auxiliary discharge means normally closed but adapted to be opened for cooperating with the normally effective discharge means to provide a substantially uniform delivery of liquor along the length of the arm; said distributor including means for retarding the speed of rotation of the arm, for flushing the filter, to such extent that the degree of saturation of the portion of the filter immediately below the arm is not substantially lessened by said rotation.

8. A rotary distributor for filters, comprising support means, a rotary structure rotatably supported thereby and including a distributor arm having discharge means normally adapted to deliver more liquor per linear foot from the outer, faster moving portion of the arm than the inner portion thereof, auxiliary discharge means normally closed but adapted to be opened for cooperating with the normally effective discharge means to provide a substantially uniform delivery of liquor along the length of the arm, and means including a motor for driving the distributor arm and effective when the motor is deenergized for retarding the speed of rotation of the arm to such extent that the degree of saturation of the portion of the filter immediately below the arm is not substantially lessened by said rotation, said means including a spring-engaged friction clutch having one member driven by the motor when the motor is energized and otherwise held stationarily, and a cooperating member mounted to rotate with the distributor arm normally driven by the first member, the spring tension and other characteristics being such that the clutch yields by a series of separate minute movements.

9. A rotary distributor for filters, comprising support means, a rotary structure rotatably supported thereby and including a distributor arm having discharge means normally adapted to deliver more liquor per linear foot from the outer, faster moving portion of the arm than the inner portion thereof, auxiliary discharge means normally closed but adapted to be opened for cooperating with the normally effective discharge means to provide a substantially uniform delivery of liquor along the length of the arm, and means for retarding the speed of rotation of the arm, for flushing the filter, to such extent that the degree of saturation of the portion of the filter immediately below the arm is not substantially lessened by said rotation, the retarded speed being one rotation in approximately 10 to 60 minutes.

JAMES D. WALKER.